United States Patent [19]
Vesamaa

[11] 3,710,491
[45] Jan. 16, 1973

[54] INDICATOR OF COCKED POSITION IN A FIRE ARM TO BE OPENED BY BREAKING

[75] Inventor: Erkki Vesamaa, Jyvaskyla, Finland
[73] Assignee: Valmet Oy, Helsinki, Finland
[22] Filed: March 15, 1971
[21] Appl. No.: 124,249

[52] U.S. Cl. ............................................. 42/1 C
[51] Int. Cl. ........................... F41c 27/12, F41c 27/00
[58] Field of Search ......... 42/1 C, 41, 42 R, 40, 69 B, 42/69 R

[56] References Cited

UNITED STATES PATENTS

| 243,223 | 6/1881 | Davenport | 42/41 |
| 266,245 | 10/1882 | Whitmore | 42/41 |
| 1,624,878 | 4/1927 | Smith | 42/1 C |

FOREIGN PATENTS OR APPLICATIONS

| 14,874 | 11/1886 | Great Britain | 42/1 C |

Primary Examiner—Benjamin A. Borchelt
Assistant Examiner—C. T. Jordan
Attorney—Richards & Geier

[57] ABSTRACT

An indicator of cocked position is used in a fire arm to be opened by breaking and having a main spring guided by a rod. The rod has a bevelled face movable in a guiding bore. Another bore crosses the guiding bore and contains an indicator. When the fire arm is cocked the bevelled face moves the indicator outwardly into an indicator outwardly into an indicating position. The indicator stays in the indicating position until the fire arm is fired. Then the rod moves out of the way of the indicator and the indicator is moved by a spring inside its bore.

3 Claims, 3 Drawing Figures

PATENTED JAN 16 1973 3,710,491

INVENTOR:
E. Vesamaa

INDICATOR OF COCKED POSITION IN A FIRE ARM TO BE OPENED BY BREAKING

The present invention concerns an indicator of cocked position in a fire arm to be opened by breaking, which has a main spring guided by a rod. An indicator according to the invention is fit to be used in any fire arms to be opened by breaking, e.g. in shotguns with one or two barrels and in shotgun and rifle combinations.

Previously as a rule no indicator of cocked position has been used in fire arms with rod-guided main spring for the reason that one has failed to devise a simple and inexpensive indicator of cocked position fit for use in connection with a rod-guided main spring. The aim of the invention is to eliminate this shortcoming and to achieve, at low cost, an indicator which is simple and reliable in operation.

The invention is characterized in that the rod of the main spring, which moves in its guiding bore, at the cocking of the fire arm by its oblique face moves an indicator into indicating position, which indicator is movable in a bore crossing the guiding bore. The indicator remains in indicating position as long as the fire arm is cocked. When the arm is fired, the rod of the main spring moves out of the way of the indicator and the indicator is moved by a spring into the position indicating uncocked condition. The same spring which moves the indicator in its bore and also prevents it from rising out of this bore may also serve as the spring maintaining the position of the safety on the fire arm. In that case a knee may be provided on this spring, which by mediation of a stud on the safety maintains the safety in the on and off positions.

The invention is described in closer detail with reference to the embodiment example shown in the attached drawing, without confining the invention in any way whatsoever to this example.

Figure 1:
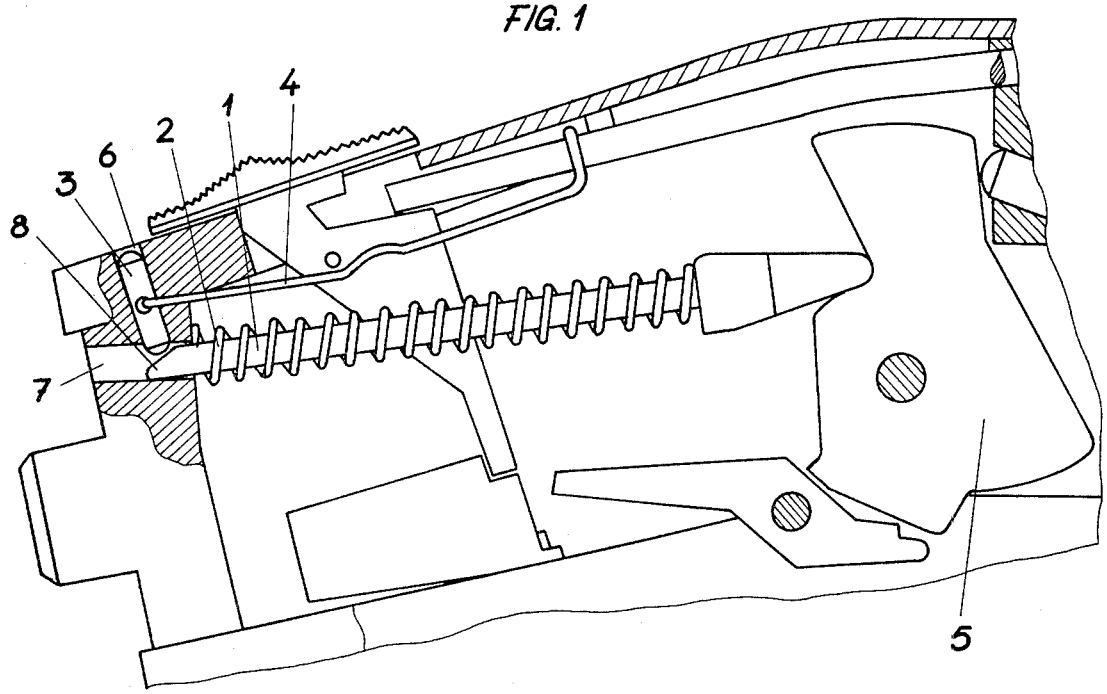
FIG. 1 shows the indicator of cocked position and the firing mechanism of the fire arm when the same has been fired.
Figure 2:
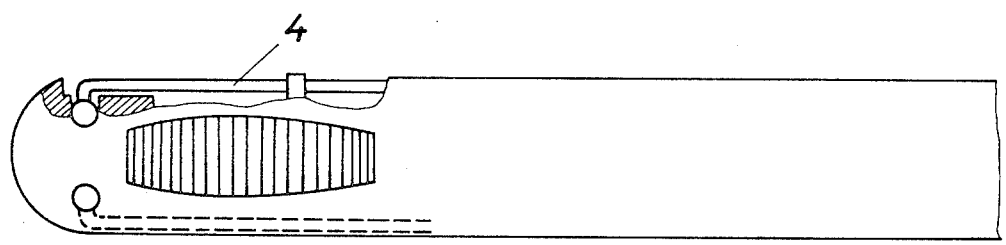
FIG. 2 shows the construction of FIG. 1, seen from above.
Figure 3:
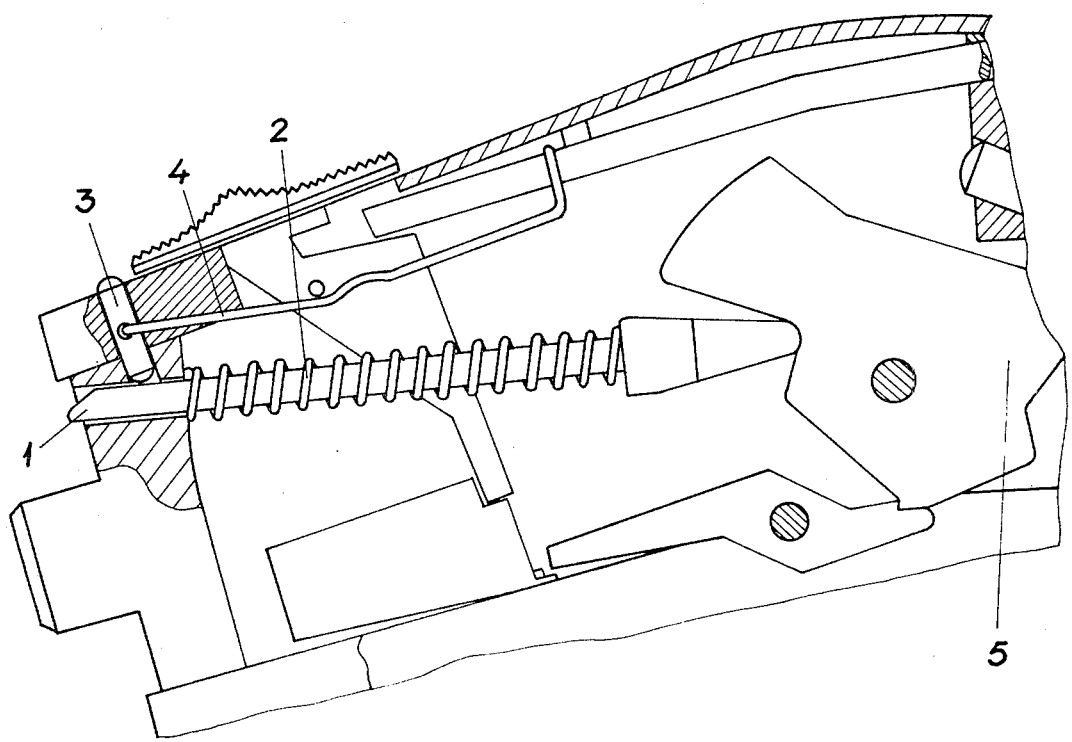
FIG. 3 shows the situation in which the indicator is in the position indicating cocked condition.

When the hammer 5 is cocked the rod 1 of the main spring 2 moves backwardly in its guiding bore 7 and the bevelled end of the rod 1 urges the indicator 3 upwardly because the bore 6 of the indicator and the guiding bore 7 cross. The end of the indicator 3 then protrudes from its bore, indicating cocked position.

When the fire arm is fired, the rod 1 of the main spring returns to its forward position and the indicator 3 moves downwardly in its bore under action the spring 4. In the embodiment example presented in the drawing the spring 4 acts both as return spring for the indicator and as the spring maintaining the off position of the safety. It is then possible to provide the spring with a knee on both sides of which by the aid of a pin the stable positions of the safety are defined. It is obvious that the spring 4 may act exclusively as retaining and returning organ for the indicator 3.

The invention is in no way confined to the above embodiment example, which comprises two indicators side by side when a fire arm with two barrels is concerned. On the contrary, an indicator according to the invention is appropriate for any fire arms to be opened by breaking, with one or several barrels, which have a main spring guided by a rod.

I claim:

1. Indicator of the cocked position of a fire arm to be opened by breaking, said fire arm having a casing, a main spring and a movable rod guiding the main spring, said rod having an end with a bevelled face, said casing having a guiding bore wherein said bevelled face is movable, said casing having another bore extending at an angle to and engaging said guiding bore, an indicator movable in said other bore and adapted to be engaged by said bevelled face, whereby said bevelled face moves said indicator into an indicating position until the fire arm is fired, whereupon said rod moves away from said indicator, and a spring connected with said indicator and moving said indicator away from said indicating position when said rod is away from said indicator.

2. Indicator in accordance with claim 1, wherein the fire arm has a safety catch, the last mentioned spring maintaining the positions of the safety catch.

3. Indicator in accordance with claim 2, wherein the safety catch has a pin and wherein the last-mentioned spring has a knee adapted to engage said pin to determine on and off positions of the safety catch.

* * * * *